April 26, 1966  B. B. MAHLER  3,248,732
AIRCRAFT POSITION LOCATION SYSTEM
Filed Oct. 9, 1962  4 Sheets-Sheet 1

INVENTOR.
BENJAMIN B. MAHLER
BY
ATTORNEY

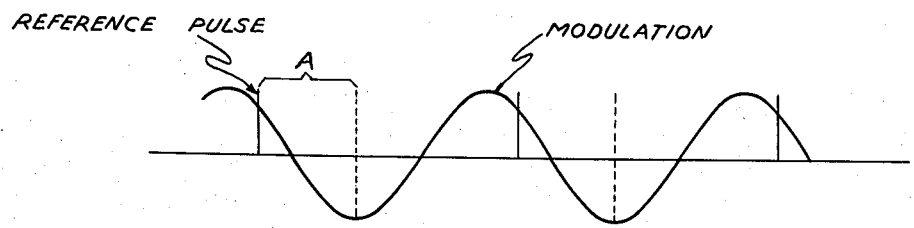
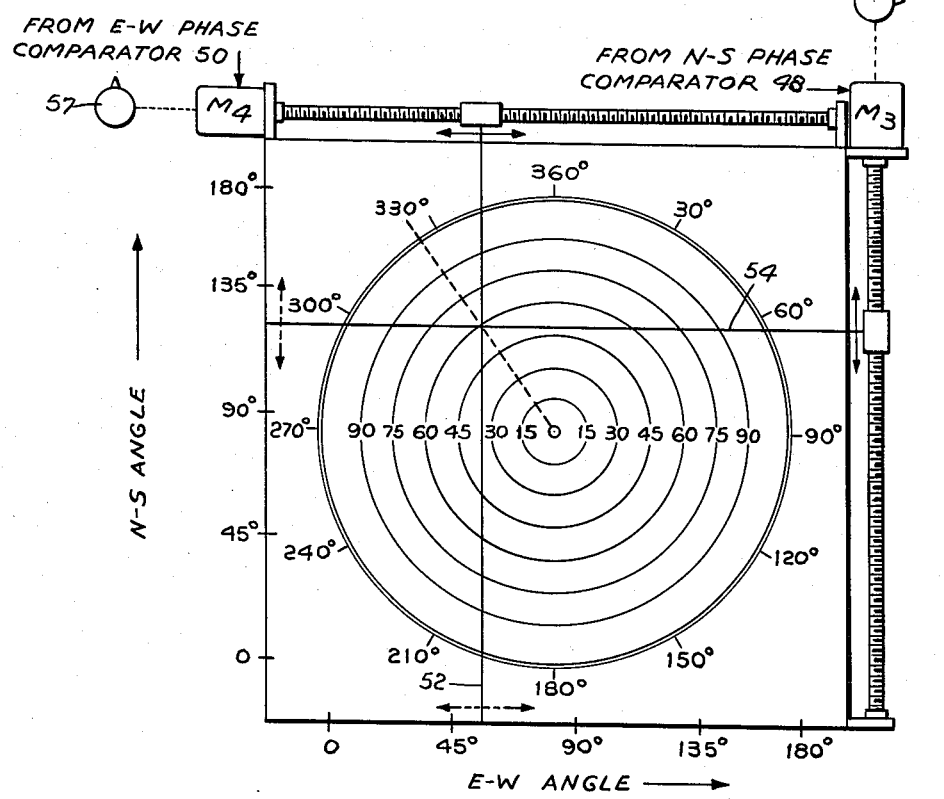

INVENTOR.
BENJAMIN B. MAHLER

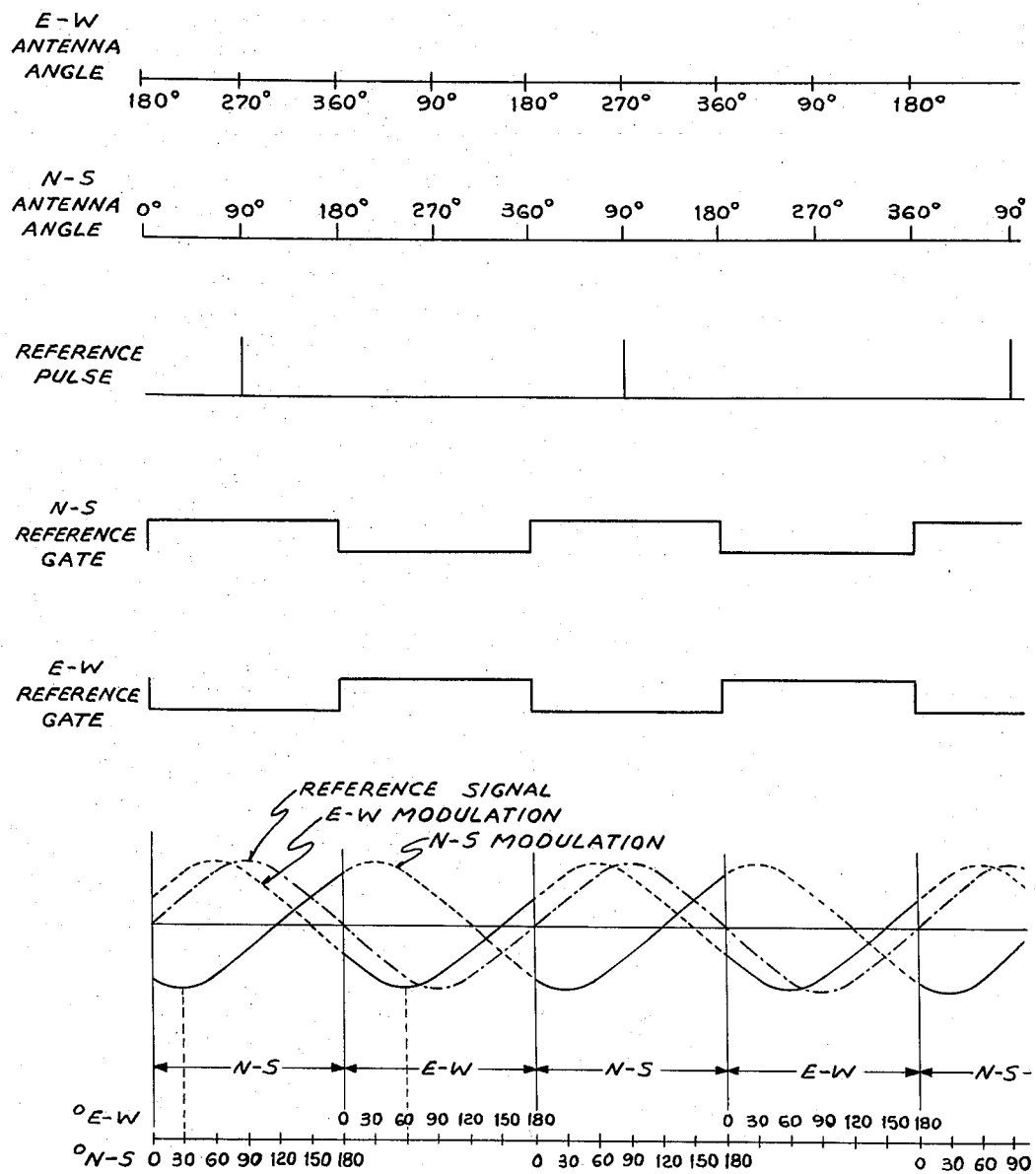

United States Patent Office 3,248,732
Patented Apr. 26, 1966

3,248,732
AIRCRAFT POSITION LOCATION SYSTEM
Benjamin B. Mahler, Paramus, N.J., assignor to International Telephone and Telegraph Corporation, Nutley, N.J., a corporation of Maryland
Filed Oct. 9, 1962, Ser. No. 229,413
13 Claims. (Cl. 343—106)

This invention relates generally to electronic systems for determining the position of an aircraft with respect to a reference point and more particularly to a steep angle landing system which is adapted to guide a helicopter down to a landing pad along any predetermined approach path. The invention is principally characterized by a novel position location system which is omnidirectional both in bearing angle and in elevation angle, i.e. a system which covers all bearing angles from 0 to 360 degrees around a reference point and all elevation angles from vertical to substantially horizontal. The invention is also characterized by novel means for determining the bearing angle and elevation angle of an aircraft with respect to a reference point and by novel means for displaying this angular infromation to the pilot of the aircraft. The invention can be used in any application that involves locating the position of an aircraft, but it is particularly useful in steep angle landing systems, which will be used as exemplary embodiments of the invention in this document.

Steep angle landing systems differ radically in their requirements from low angle landing systems such as used in connection with fixed-wing aircraft. The low angle landing systems only need to define one fixed glide path as the final approach to each runway of an airport. In a steep angle landing system, however, the aircraft, which is usually a helicopter, is not constrained by fixed runways, which means that the steep angle landing system should define a continuum of approach paths extending from 0 to 360 degrees around the landing pad at elevation angles ranging from vertical to substantially horizontal. It is possible, of course, to limit the steep angle landing system to a small number of fixed approach paths, but this is undesirable because it adds artificial constraints which complicate the landing procedure and make it more hazardous. With a small number of fixed approach paths, the wind direction will usually be transverse to the approach path, and the pilot will have to contend with cross wind drift, which is not present when he is free to make his approach directly up wind regardless of wind direction, as he is with a continuum of approach paths. In addition, if the pilot is constrained to a fixed angle of descent, he will have to contend with downwind drift, which is not present when he is free to select his angle of descent in accordance with the wind velocity. It will be apparent, then, that a steep angle landing system should provide a continuum of approach paths, and it will be equally apparent that the prior art low angle landing systems, which provide a small number of fixed approach paths, cannot be used as steep angle landing systems.

Accordingly, one object of this invention is to provide a steep angle landing system which defines a continuum of approach paths extending from 0 to 360 degrees around a landing pad at elevation angles ranging from vertical to substantially horizontal.

Another object of this invention is to provide an aircraft position location system which is omnidirectional both in bearing angle and in elevation angle.

An additional object of this invention is to provide novel means for determining the bearing angle and elevation angle of an aircraft with respect to a reference point for displaying this angular information to the pilot of the aircraft.

Other objects and advantages of the invention will be apparent to those skilled in the art from the following description of one specific embodiment thereof, as illustrated in the attached drawings, in which:

FIG. 3 is a set of waveforms showing one method of measuring angles in accordance with this invention;

FIG. 6 is a set of waveforms illustrating the operation of the transmitter and receiver circuits of FIGS. 4 and 5; and FIG. 7 is a plan view of one illustrative information display of this invention.

Figure 1:
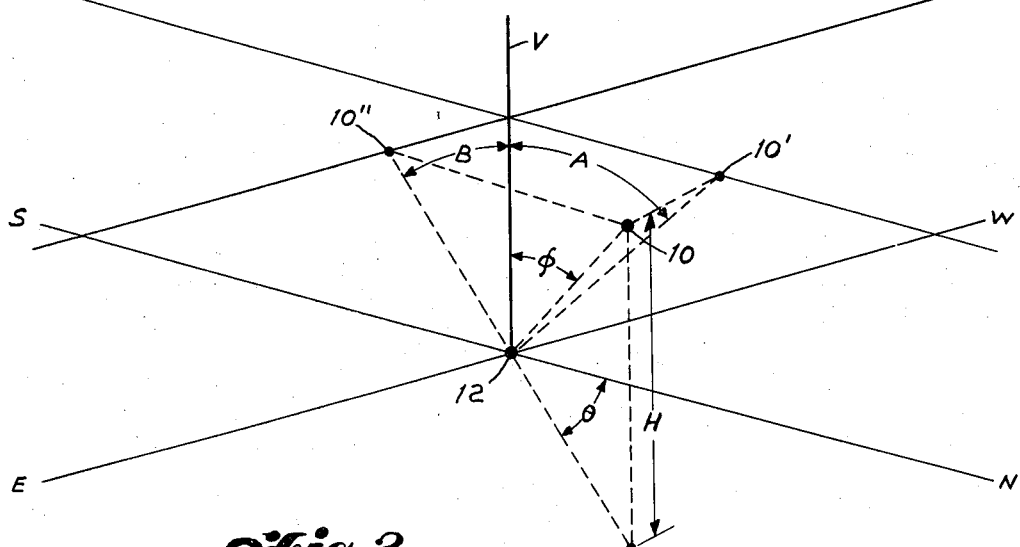
FIG. 1 is a perspective drawing showing the method of determining the position of an aircraft in accordance with this invention.

Referring to FIG. 1, the position of an aircraft 10 with respect to a reference point 12 can be determined by a bearing angle $\theta$, which is measured with respect to a horizontal line NS passing through point 12, and an elevation angle $\phi$, which is measured with respect to a vertical line V passing through point 12, and an altitude H, which is measured with respect to a horizontal plane NSEW passing through point 12. The altitude H, however, is not measured in the device of this invention, because all aircraft are equipped with altimeters which give the pilot an accurate indication of altitude. The pilot will therefore be able to definitely fix his position with respect to point 12 if he is provided with an accurate indication of his azimuth angle $\theta$ and his elevation angle $\phi$.

In accordance with this invention, the azimuth angle $\theta$ and elevation angle $\phi$ are not measured directly, but are rather measured in terms of angles A and B, which are the elevation angles of the projected positions 10' and 10" of aircraft 10 on a pair of vertical, mutually perpendicular reference planes passing through reference point 12. It will be understood by those skilled in the art that projected positions 10' and 10" are defined by drawing a perpendicular from aircraft 10 to each of the reference planes, which are preferably but not necessarily oriented along the north-south (NS) line and east-west (EW) line through reference point 12. It can be shown, by well known theorems of geometry, that the angles A and B are related to the angles $\theta$ and $\phi$ by the following formulas:

(1) $$\theta = \arctan\left[\frac{\tan B}{\tan A}\right]$$

(2) $$\phi = \arctan \sqrt{\tan^2 A + \tan^2 B}$$

From the above noted formulas, it might appear that computer circuits would be necessary to derive the angles $\theta$ and $\phi$ from angles A and B, but it will be shown later that this derivation can be performed by a very simple display device.

The angles A and B, which will hereinafter be referred to as the NS angle and EW angle respectively, are measured by means of a transmitter located on the ground near reference point 12 and a receiver and display device mounted in the aircraft. The transmitter contains two antennas, one of which transmits a signal for measuring the NS angle and the other of which transmits a signal for measuring the EW angle. The basic concept of the measurement system is illustrated in FIGS. 2, 2A, and 3, which show one illustrative antenna of this invention and the modulation pattern produced thereby.

Figure 2:
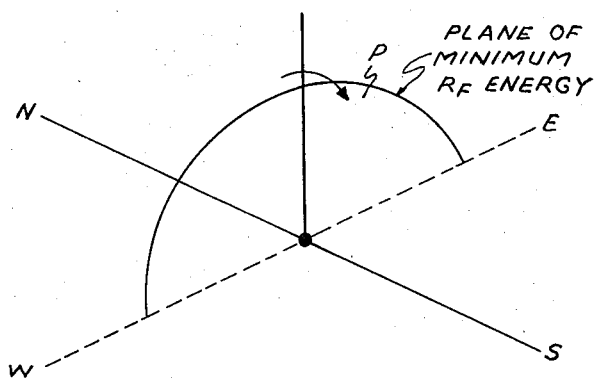
FIG. 2 is a perspective drawing showing the antenna radiation pattern of one illustrative transmitting antenna of this invention.
Figure 2A:
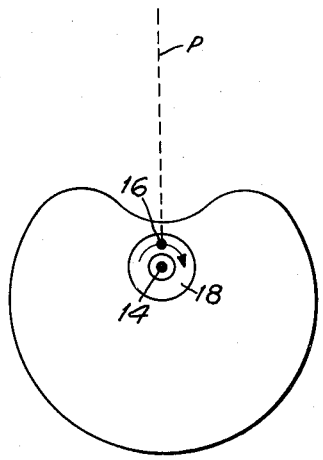
FIG. 2A is an elevation section taken through the N-S plane of FIG. 2.

Referring to FIGS. 2 and 2A, an omnidirectional horizontal antenna 14 is modified by a parallel reflector element 16 to produce a cardioid radiation pattern containing a null plane P in which the transmitted RF energy is at a minimum. This null plane is the plane which includes both the antenna element and the reflector element. Reflector element 16 is mounted on a rotatable ring 18, which is rotated around the axis of antenna element 14 to sweep the null plane P about an east-west axis so as to produce an amplitude modulated signal which can be received by aircraft in the neighborhood. The amplitude modulated signal will have the general form shown in FIG. 3, with the frequency of the modulated signal being equal to the rotary speed of reflector element 18, and the minimum points of the modulated signal occurring when the null plane P is aligned with the aircraft receiving the signal. A reference pulse is generated by the transmitter when the null plane is in some predetermined reference position, such as the vertical or horizontal position, whereby the NS angle of the aircraft receiving the signals can be determined in the aircraft by means for measuring the time difference between the reference pulse and the minimum point on the modulated signal.

It should be noted that the above described antenna structure will, in effect, project the position of the aircraft onto the NS plane for measurement of the projected elevation angle. This projection stems from having a measurement plane (the null plane) which is rotatable about an axis perpendicular to the reference plane (the NS plane). It should also be noted that the invention is not limited to the particular antenna structure or radiation pattern shown in FIGS. 2 and 2A. If desired, the measurement plane could comprise a plane of maximum RF energy instead of a plane of minimum RF energy, and any antenna structure can be used which provides a rotatable measurement plane.

The measurement of the EW angle is performed by a second antenna structure which is the same as the above described antenna structure but which rotates around an axis perpendicular to the EW plane. The NS and EW angle information can be separated by several methods: (1) by using different transmitter frequencies for the EW and NS antennas, (2) by using different modulation frequencies for the EW and NS signals, i.e. by rotating the measurement planes at different speeds, and (3) by rotating the EW and NS measurement planes in synchronism 180° out of phase and switching the transmitter from one antenna to the other on alternate half cycles of rotation. The last mentioned method is used in the preferred embodiment of the invention, as will be described below.

Figure 4A:
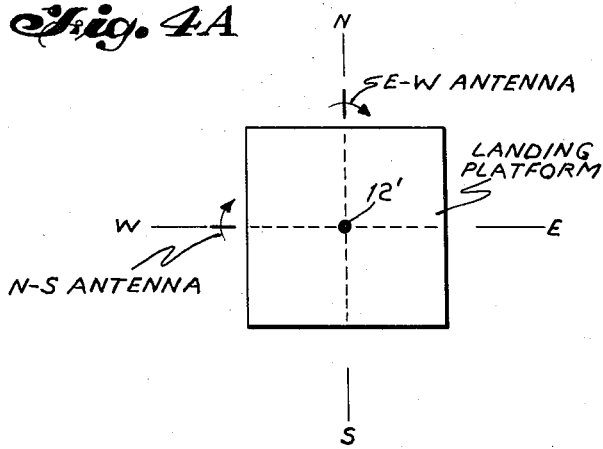
FIG. 4A is a plan view of a landing platform showing one illustrative position for the antennas of this invention.
Figure 4:
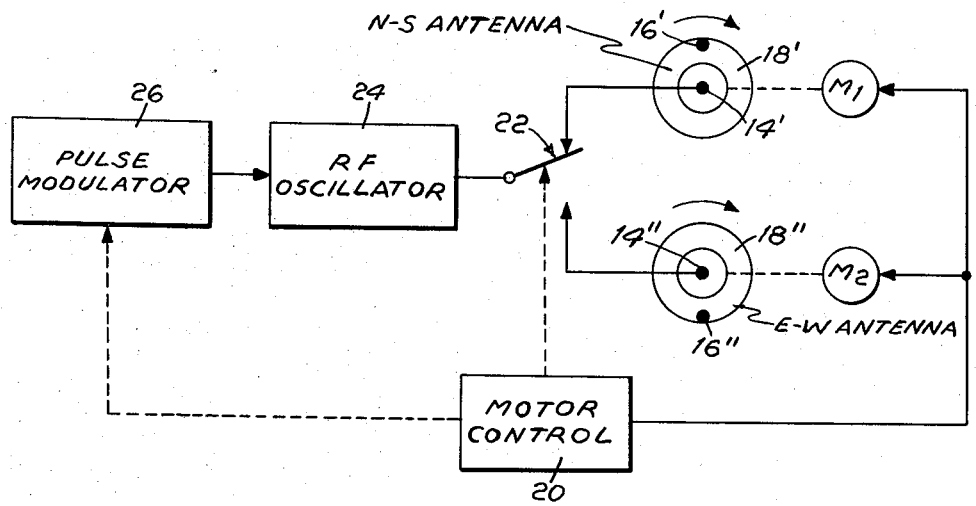
FIG. 4 is a block diagram of one illustrative transmitter circuit of this invention.
Figure 5:
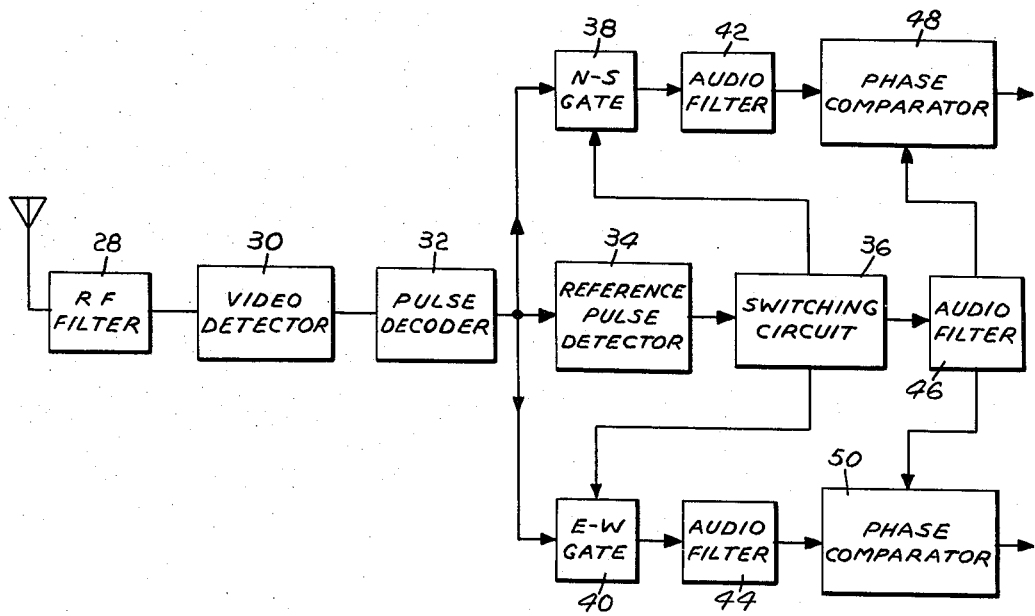
FIG. 5 is a block diagram of one illustrative receiver circuit of this invention.

FIGS. 4, 4A, and 5 show illustrative transmitter-receiver circuits which can be used in connection with this invention. The transmitter circuit contains two antennas such as described above which are driven in synchronism 180° out of phase by drive motors M1 and M2 and motor control circuit 20, which can be a selsyn transmitter motor or any other suitable drive device. Motor control circuit 20 also drives a radio frequency switch 22, which switches the output of RF oscillator 24 from one antenna to the other on alternate half cycles of the antenna drive, and also actuates a reference pulse modulator 26 when the antennas are in a predetermined reference position. If a selsyn transmitter circuit is used for motor control circuit 20, the above noted switching functions can be performed quite simply by means of cam actuated switches, as will be readily apparent to those skilled in the art. The two antennas are mounted on adjacent sides of the landing pad, as shown in FIG. 4A, with their axes of rotation aligned so as to intersect in the middle of the landing pad. The intersection 12' of the two axes defines the reference point for angular measurements.

Before describing the detailed operation of this transmitter circuit, it should be noted that the angular measurements are made only during 180° of the full 360° rotary cycle of antenna reflector elements 16' and 16''. Therefore, when the two reflector elements are driven in synchronism 180° out of phase, only one antenna will be in its measurement range at any given time, whereby no lapse of information transmission will occur by switching the oscillator from one antenna to another on alternate half cycles. Furthermore, as a practical matter, it is not necessary to measure elevation angles smaller than 4 degrees from the vertical, so that the range of ±4 degrees around the two horizontal positions of the reflector elements (0 and 180 degrees) can be used as a switching interval in which the oscillator is switched from one antenna to the other.

The operating cycle of the above described transmitter circuit is quite simple. As the two reflector elements 16' and 16'' are rotated, RF energy will be transmitted from the antenna which is in the 0–180° range of reflector rotation, and when the energized antenna comes within 4 degrees of its horizontal position, the RF energy is switched to the other antenna via switch 22. Since the two antennas are 180 degrees out of phase, the switchover will occur just as the other antenna is entering its 0–180 degree range of rotation. When the second antenna reaches the end of its 0–180 degree range, the RF energy is switched back to the first antenna, and so on ad infinitum. Thus each of the antennas will, in the 0–180 degree range of rotation, produce a modulated signal in any receiver within its range of transmission as explained previously. The transmitting antenna is identified by the reference pulse, which in this particular embodiment is generated when the NS antenna is in its 90° position. This provides both a reference for measuring the NS and EW angles and for separating the NS and EW information.

The above described transmitter is preferably a pulsed transmitter rather than a CW transmitter, since a pulsed transmitter is more efficient. The pulse transmission may, for example, comprise a series of double pulses spaced 3.5 microseconds apart, each 0.5 microsecond wide, occuring at a pulse repetition rate of 2000 pulses per second. The reference pulse could comprise a sequence of 10 double pulses, and if two or more transmitters are located within range of each other, pulse coding can be employed to avoid interference. With the above described pulses, this coding can be accomplished by changing the spacing of the double pulses in multiples of 3.5 microseconds.

FIG. 5 shows one illustrative receiver circuit which can be used in connection with the transmitter circuit of FIG. 4, and FIG. 6 is a set of waveforms illustrating the joint operation of the receiver and transmitter circuits. Referring to FIG. 5, the receiver circuit comprises an RF filter 28, which is tunable to select the desired transmitter frequency, a video detector circuit 30, and a pulse decoder 32 which passes the pulse code of the selected transmitter and blocks noise pulses or pulses from interfering transmitters. The output of pulse decoder 32 contains the normal transmission pulses from both transmitter antennas and the reference pulse, which is generated only when the NS transmitter antenna is in its 90° position. The reference pulse is detected by a reference pulse detector circuit 34 and applied to a switching circuit 36, which can be a free running multivibrator having the same frequency as the input modulation, i.e. the same frequency as the rotating elements of the transmitter antennas. Switching circuit 36 opens NS gate 38 during the time interval when the NS transmitter antenna is energized and opens EW gate in the time interval when the EW transmitter is energized. The NS and EW pulses are then applied to corresponding audio filters 42 and 44, which change the pulse modulation to sinusoidal form. The output of switching circuit 36 is also applied to an audio filter 46, which produces a sinusoidal reference signal, and the NS angle and EW angle of the aircraft are computed by measuring the phase difference between the reference signal and the input signals in phase comparators 48 and 50. The output of phase comparator 48 is a signal proportional to the NS angle of the aircraft, and the output of phase comparator 50 is a signal proportional to the EW angle of the aircraft.

The interaction between the above descirbed transmitter and receiver circuits can be more clearly described in connection with the waveforms of FIG. 6, which show the phase relationships for an aircraft having a NS angle of 30° and an EW angle of 60°. In FIG. 6, the NS and EW reference gates represent the two outputs of switching circuit 36 in FIG. 5. If a free-running multivibrator is used for switching circuit 36, the NS and EW reference gates would be complementary output signals of the multivibrator, which would be synchronized with the transmitting antenna by the reference pulse. In this particular embodiment, the reference pulse is generated when the NS antenna is in its 90° position, which means that switching circuit 36 would have to contain input delay means to delay the reference pulse for 90° of antenna rotation, since the switching action occurs at the 180° and 360° positions of the NS antenna. In other embodiments of the invention, the reference pulse could be generated at the 180° or 360° position of the NS antenna, which would eliminate the need for delay means. The NS and EW reference gates open their respective gate circuits 38 and 40 during the positive half cycle and close their respective gate circuits during the negative half cycle. This means that the reference signal, which is derived from switching circuit 36 via audio filter 46, will be compared to the NS modulation when the NS transmitting antenna is energized and to the EW modulation when the EW transmitting antenna is energized. This separates the EW angle information from the NS angle information in the receiver circuit.

It should be noted that the NS and EW angles are measured by the phase difference between the start of the measurement interval and the low point of the modulation signal being measured. This means that the NS angle, which is measured against the positive half cycle of the reference signal, will be equal to the phase difference minus 90°, since the NS angle will be equal to 90° when the NS modulation is exactly 180° out of phase with the reference signal. In FIG. 6, for example, the NS modulation lags the reference signal by 120°, which gives a NS angle of +120°−90°=30°. The EW angle, however, is measured against the negative half cycle of the reference signal, and therefore the EW angle is equal to and a phase lag is given a positive sign. Therefore, in equal to 90° when the EW modulation is exactly in phase with the reference modulation. In the measurement of both the EW and NS angles, a phase lead is a minus sign and a phase lag isgiven a positive sign. Therefore, in FIG. 6, the EW angle is equal to 60°, since the EW modulation leads the reference modulation by 30°, and −30°+90°=60°. The above noted computations for the EW and NS angles can be made by well known prior art means in phase comparators 48 and 50 or in the display device which is coupled thereto to display the angular information to the pilot.

To provide a convenient display for the pilot of the aircraft, the NS and EW angles are preferably translated into the corresponding azimuth angle $\theta$ and elevation angle $\phi$ in accordance with Formulas 1 and 2, which were discussed in connection with FIG. 1. This translation can be made by any suitable means, but is preferably made in the novel display-translator means illustrated in FIG. 7. This display-translator means comprises a pair of movable cross hairs 52 and 54 which are positioned over a series of concentric circles in accordance with the EW and NS angles. The center of the concentric circles represents the reference point, or landing pad, and the intersection of the cross hairs represents both the azimuth angle and the elevation angle of the aircraft with respect to the reference point. An azimuth scale is marked on the outermost concentric circle, and a line drawn between the center of the concentric circles and the intersection of the cross hairs give the azimuth angle of the aircraft with respect to the reference point. The elevation angle is determined by the distance from the center of the concentric circles and the intersection of the cross hairs. This distance is conveniently measured by the concentric circles, which are spaced to correspond to elevation angle units. In the display of FIG. 7, the circles are spaced in increments of 15 degrees of elevation angle, but it will be understood by those skilled in the art that finer graduations could be provided if desired. The cross hairs 52 and 54 are positioned automatically along lead screw-slider mechanisms 53 and 55 by synchro motors M3 and M4, which are responsive to the output signals of phase comparators 48 and 50, as well be readily understood by those skilled in the art. The NS-EW angle scales can be omitted from the display if desired, since the pilot is only interested in his azimuth angle and elevation angle.

The foregoing display can be improved by coupling manual adjustment knobs 56 and 57 to the NS and EW synchros so that the pilot can pre-set any desired azimuth angle and elevation angle for his approach. In this case the cross hairs would intersect at the center of the concentric circles when the aircraft was on the pre-set bearing and descent angle, and the displacement of the horizontal cross hair from the center would indicate the up or down correction required to stay on the proper descent angle, while the displacement of the vertical cross hair from the center would indicate the left or right correction required to stay on the proper bearing. With this modification, the pilot can stay on the proper approach path by keeping the cross hairs centered on the display.

Although this invention has been illustrated by a ground based steep angle landing system, it should be understood that the invention has many other uses. It can, for example, be used as a carrier based landing system for helicopters and for fixed wing aircraft. In this case one antenna would be aligned with the longitudinal axis of the flight deck rather than along a north-south line as disclosed above. The invention could also be used as a ground based low angle landing system for fixed wing aircraft. In this application, the reference point would preferably be set to coincide with an intersection of several runways, whereby one installation would provide a continuum of glide paths for all runways from both directions. This would provide a significant saving in cost and equipment over the prior art low angle landing systems. In addition, the invention can be used in navigation or in any other application where the bearing angle and/or elevation angle of an aircraft is involved.

From the foregoing description it will be apparent that this invention provides a novel aircraft position detector and a novel steep angle landing system which have many advantages over those heretofore known in the art. It will also be apparent that this invention provides novel means for determining the bearing angle and elevation angle of an aircraft with respect to a reference point and novel means for displaying this angular information to the pilot. And it should be understood that this invention is by no means limited to the specific structures disclosed herein, since many modifications can be made in the structure disclosed without departing from the basic teaching of this invention. For example, a CW transmitter and receiver circuit could be used in place of the pulse transmitter and receiver circuits disclosed herein, and reference pulses could be generated at the 180° position of the antennas rather than at the 90° position. These and many other modifications of the invention will be apparent to those skilled in the art, and this invention includes all modifications falling within the scope of the following claims.

What is claimed is:

1. An aircraft position location system for determining the position of an aircraft with respect to a reference point, said system comprising a source of radio frequency energy, first and second rotatable antenna means each rotatable about respective axes passing through said reference point, each of said antenna means being capable of producing a modulated output signal when energized by said radio frequency energy source, means for impressing a reference signal modulation on the output of said radio frequency source when one of said antenna means is in a predetermined rotational position, and receiver means in said aircraft for receiving said output and reference signal modulations and including means for measuring the phase differences between said reference signal modulation and the modulated output signals of said first and second antenna means.

2. The combination defined in claim 1 wherein said first and second antenna means are each adapted to produce an amplitude modulated output signal when energized by said radio frequency source and rotated, the frequency of each of said amplitude modulated signals being equal to the frequency of rotation of each of said antenna means respectively and the phase of said amplitude modulated output signals being variable in accordance with position with respect to said antenna means.

3. The combination defined in claim 2 and also including modulation separation means in said receiver means for separating the signals received from said first and second antenna means.

4. The combination defined in claim 3 wherein the axes of rotation of said two antenna means are mutually perpendicular and wherein said axes intersect at said reference point.

5. The combination defined in claim 4 wherein the phase difference between said reference signal modulation and the output modulation received from each of said two antenna means is a function of the angle of said aircraft with respect to a predetermined position of said antenna means, and also including means for translating said angles into an azimuth angle and an elevation angle in accordance with the formulas:

$$\phi = \arctan \sqrt{\tan^2 A + \tan^2 B}$$

$$\theta = \arctan \left[ \frac{\tan B}{\tan A} \right]$$

where $A$ = the angle of said aircraft with respect to one antenna means, $B$ = the angle of said aircraft with respect to the other antenna means, $\phi$ = the elevation angle of said aircraft with respect to said reference point, and $\theta$ = the azimuth angle of said aircraft with respect to said reference point.

6. The combination defined in claim 2 wherein said antenna means are rotated in synchronism 180 degrees out of phase, and also including means for switching said source of radio frequency energy from one antenna means to the other on alternate half cycles of rotation.

7. The combination defined in claim 6 wherein said receiver means contains two information channels each corresponding to one of said antenna means, and also including means for switching the receiver input from one of said information channels to the other in synchronism with the switching of said source of radio frequency energy from one antenna means to the other.

8. The combination defined in claim 7 wherein the phase difference between said reference signal modulation and the output modulation received from each of said two antenna means is a function of the angle of said aircraft with respect to a predetermined position of each said antenna means, and also including means for translating said angles into an azimuth angle and an elevation angle in accordance with the formulas:

$$\phi = \arctan \sqrt{\tan^2 A + \tan^2 B}$$

$$\theta = \arctan \left[ \frac{\tan B}{\tan A} \right]$$

where $A$ = the angle of said aircraft with respect to one antenna means, $B$ = the angle of said aircraft with respect to the other antenna means, $\phi$ = the elevation angle of said aircraft with respect to said reference point, and $\theta$ = the azimuth angle of said aircraft with respect to said reference point.

9. An aircraft position location system for determining the position of an aircraft with respect to a reference point, said system comprising a source of radio frequency energy, first and second rotatable antenna means each rotatable about respective axes passing through said reference point, each of said rotatable antennas having an irregular antenna radiation pattern and being operable to produce an amplitude modulated output signal when energized by said radio frequency source and rotated, means for impressing a reference signal modulation on the output of said radio frequency source when one of said antennas is in a predetermined rotational position, receiver means in said aircraft for receiving the output signals of said antennas and said reference signal modulation, means in said receiver means for separating the output signal of one antenna from the output signal of the other antenna and from said reference signal modulation, and means in said receiver for measuring the phase differences between said reference signal and the output signals from said first and second antennas.

10. The combination defined in claim 9 wherein the phase differences between said reference signal modulation and the output modulation received from each of said two antenna means are a function of the angle of said aircraft with respect to a predetermined position of said antenna means, and also including means for translating said angles into an azimuth angle and an elevation angle in accordance with the formulas:

$$\phi = \arctan \sqrt{\tan^2 A + \tan^2 B}$$

$$\theta = \arctan \left[ \frac{\tan B}{\tan A} \right]$$

where $A$ = the angle of said aircraft with respect to one antenna means, $B$ = the angle of said aircraft with respect to the other antenna means, $\phi$ = the elevation angle of said aircraft with respect to said reference point, and $\theta$ = the azimuth angle of said aircraft with respect to said reference point.

11. In an aircraft position location system for determining the position of an aircraft with respect to a reference point, the improvement comprising a source of radio frequency energy, first and second rotatable antenna means each rotatable about respective axes passing through said reference point, each of said rotatable antennas having an irregular antenna radiation pattern and being operable to produce an amplitude modulated output signal when energized by said radio frequency source and rotated, and means for impressing a reference signal modulation on the output of said radio frequency source when one of said antennas is in a predetermined rotational position.

12. The combination defined in claim 11 wherein the axes of rotation of said two antenna means are mutually perpendicular and wherein said axes intersect at said reference point.

13. The combination defined in claim 12 wherein said antenna means are rotated in sychronism 180 degrees out of phase, and also including means for switching said source of radio frequency energy from one antenna means to the other on alternate half cycles of rotation.

References Cited by the Examiner

UNITED STATES PATENTS

| | | | |
|---|---|---|---|
| 2,718,061 | 9/1955 | Omberg et al. | 33—1 |
| 2,930,129 | 3/1960 | Richardson | 33—1 |
| 3,099,006 | 7/1960 | De Rosa | 343—106 |
| 3,115,632 | 12/1963 | Peach et al. | 343—106 |
| 3,136,997 | 6/1964 | Lucanera et al. | 343—106 X |

LEWIS H. MYERS, *Primary Examiner.*

CHESTER L. JUSTUS, *Examiner.*

T. H. TUBBESING, H. C. WAMSLEY, P. M. HINDERSTEIN, *Assistant Examiners.*